US006762363B2

(12) United States Patent
Yamashita et al.

(10) Patent No.: US 6,762,363 B2
(45) Date of Patent: Jul. 13, 2004

(54) WIRE COVER AND A CONNECTOR PROVIDED THEREWITH

(75) Inventors: Kazunori Yamashita, Yokkaichi (JP); Koji Okutani, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 10/147,192

(22) Filed: May 14, 2002

(65) Prior Publication Data

US 2002/0170736 A1 Nov. 21, 2002

(30) Foreign Application Priority Data

May 15, 2001 (JP) ....................................... 2001-144688

(51) Int. Cl.[7] ................................................ H02G 15/02
(52) U.S. Cl. ....................... 174/74 R; 174/79; 439/471; 439/157
(58) Field of Search ................................. 174/74 R, 79, 174/84 R, 84 S; 439/471, 464, 465, 466, 467, 468, 473, 152–160

(56) References Cited

U.S. PATENT DOCUMENTS 3,622,942 A * 11/1971 Rynk .......................... 439/471
3,638,169 A * 1/1972 Caveney et al. ............ 439/471
3,792,417 A * 2/1974 Punako ....................... 439/471
3,936,129 A * 2/1976 Guy ........................... 439/464
4,341,431 A * 7/1982 Woratyla .................... 439/471
4,488,769 A * 12/1984 Feigl .......................... 439/449
4,606,596 A * 8/1986 Whiting et al. ............. 439/465
5,055,066 A * 10/1991 Garretson ................... 439/464
5,531,605 A * 7/1996 Taniuchi et al. ............ 439/157
5,700,156 A * 12/1997 Bussard et al. ............. 439/471
5,709,560 A * 1/1998 Hio ............................ 439/157
5,911,595 A * 6/1999 Orr et al. ..................... 439/471
6,409,525 B1 * 6/2002 Hoelscher et al. .......... 439/140

FOREIGN PATENT DOCUMENTS

JP 11086957 A * 3/1999 ........... H01R/13/56

* cited by examiner

*Primary Examiner*—William H. Mayo, III
(74) *Attorney, Agent, or Firm*—Anthony J. Casella; Gerald E. Hespos

(57) ABSTRACT

A wire fixing portion (26) with a substantially U-shaped cross section that projects from an edge section of a wire draw-out opening (22) of a wire cover (20). The wire fixing portion (26) has a pair of bundling holes (28) through which a bundling band (40) can be introduced for bundling wires (W). In order to fix the wires (W) to the wire cover (20), the bundling band (40) is put on the wires (W) and the wire fixing portion (26) to fasten the wires (W). At this time, the wires (W) can be firmly fixed to the wire fixing portion (26) by suitably selecting a mounting path of the bundling band (40) based on the number of the wires (W) to be fixed and the outer diameter thereof.

6 Claims, 6 Drawing Sheets

WIRE COVER AND A CONNECTOR PROVIDED THEREWITH

BACKGROUND OF THE INVENTION

1. Field of the Invention

The invention relates to a wire cover for covering wires drawn out from a housing, to a connector provided with a wire cover and to a fastening method.

DESCRIPTION OF THE RELATED ART

A known wire cover is identified by the numeral 1 in FIG. 8 and also is disclosed in Japanese Unexamined Patent Publication No. 4-6084. The wire cover 1 is mounted on a housing 2 and covers wires W that extend from terminal fittings in the housing 2. The wire cover 1 has a wire draw-out opening 3 at one side for accommodating the wires W that are drawn to the outside, and a U-shaped wire fixing portion 4 projects from an edge of the wire draw-out opening 3. The wires W are fixed to the wire fixing portion 4 by a bundling band 5 that is wrapped around both the wires W and the wire fixing portion 4.

The wires W may be held loosely between the wire fixing portion 4 and the bundling band 5 if the number of the wires to be bundled is small or the outer diameter of the wires W is small in comparison with the size of the wire fixing portion 4.

In view of the above, an object of the invention is to fix wires firmly with a bundling band, even if the number of wires is small.

SUMMARY OF THE INVENTION

The invention is directed to a wire cover that is mountable on a housing. The housing accommodates a plurality of terminal fittings and each terminal fitting is connected with the end of a wire. The wire cover substantially covers portions of the wires drawn out from the housing. The wire cover comprises a wire fixing portion that extends from an edge of a wire draw-out opening through which the wires are drawn out. A bundling band is employed to the wires to fasten the wires to the wire fixing portion. The wire fixing portion comprises at least one bundling hole through which the bundling band is introduced to make a mounting path of the bundling band selectable from a plurality of mounting paths. Accordingly, the wires can be fixed firmly to the wire fixing portion by suitably selecting the mounting path of the bundling band based on the number of the wires to be fixed and the outer diameters thereof.

The wire fixing portion preferably extends substantially continuously from an edge of the wire draw-out opening and preferably has a substantially U-shaped cross section.

A plurality of bundling holes preferably are arranged at an angle to an extending direction of the wires near the wire draw-out opening.

The plurality of bundling holes increases the number of selectable mounting paths of the bundling band, and a suitable mounting path can be selected based on the number of wires to be fixed and other factors.

The wire draw-out opening preferably is arranged to align the wires at an angle to a projecting direction of the wires from the housing.

The wire fixing portion preferably comprises two lateral walls that are interconnected by a connecting wall. The bundling holes preferably are provided in a border between the lateral walls and the connecting portion. The wire fixing portion also may comprise one or more stopper projections for preventing the bundling band from slipping off.

The invention also is directed to a connector with a housing that accommodates a plurality of terminal fittings. The terminal fittings are connected with ends of wires, and the above-described wire cover is mountable to the housing for substantially covering portions of the wires drawn out from the housing.

The invention further is directed to a method for fastening a plurality of wires to a wire cover. The wire cover is mountable on a housing that accommodates a plurality of terminal fittings, each of which is connected with the end of a wire. Thus the wire cover substantially covers portions of the wires drawn out from the housing. The method comprises the steps of drawing out the plurality of wires from a draw-out opening of the cover, selecting a mounting path of the bundling band from a plurality of mounting paths, and arranging the bundling band on the selected mounting path to fix the wires to a wire fixing portion that extends from an edge of the wire draw-out opening. At least one mounting path is defined by at least one bundling hole of the wire fixing portion.

The selecting step selection preferably is made based on the number of the wires to be fixed and/or the outer diameters thereof.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

Figure 1:
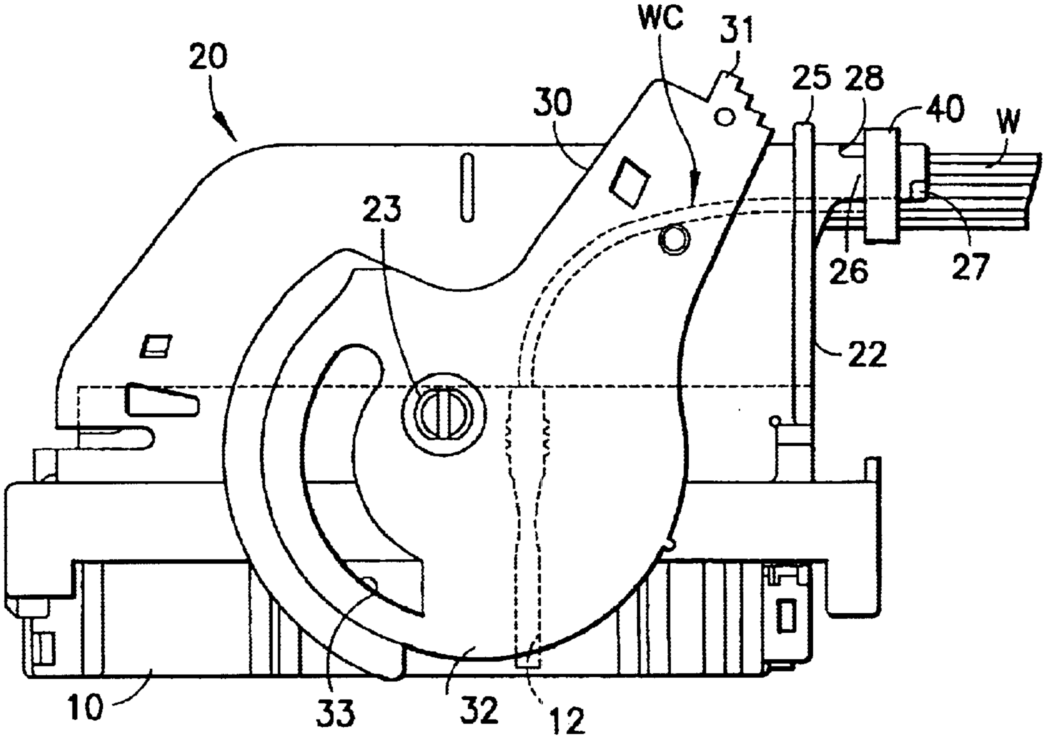
FIG. 1 is a side view showing a lever-type connector provided with a wire cover according to one embodiment of the invention.

A lever-type connector in accordance with the invention includes a female housing 10 for accommodating female terminal fittings 12, as shown in FIG. 1. Wires W extend from the female terminal fittings 12, and a wire cover 20 is mounted to the female housing 10 for substantially covering distal portions WC of the wires W that are drawn out from the female housing 10. A lever 30 is mounted to bridge opposite sides of the wire cover 20 in a widthwise direction. In the following description, the left side of FIG. 1 is referred to as the front side.

The female housing 10 is made e.g. of a synthetic resin and defines a substantially rectangular parallelepipedic shape. A plurality of side by side cavities (not shown) penetrate through the housing 10 in a vertical direction and the female terminal fittings 12 are insertable into the respective cavities from above. The wires W have their ends connected with the female terminal fittings 12, and are drawn out above the female housing 10. The female housing 10 is connectable with an unillustrated male housing, and the respective female terminal fittings 12 can be connected electrically with male terminal fittings by connecting the female and male housings.

Figure 2:
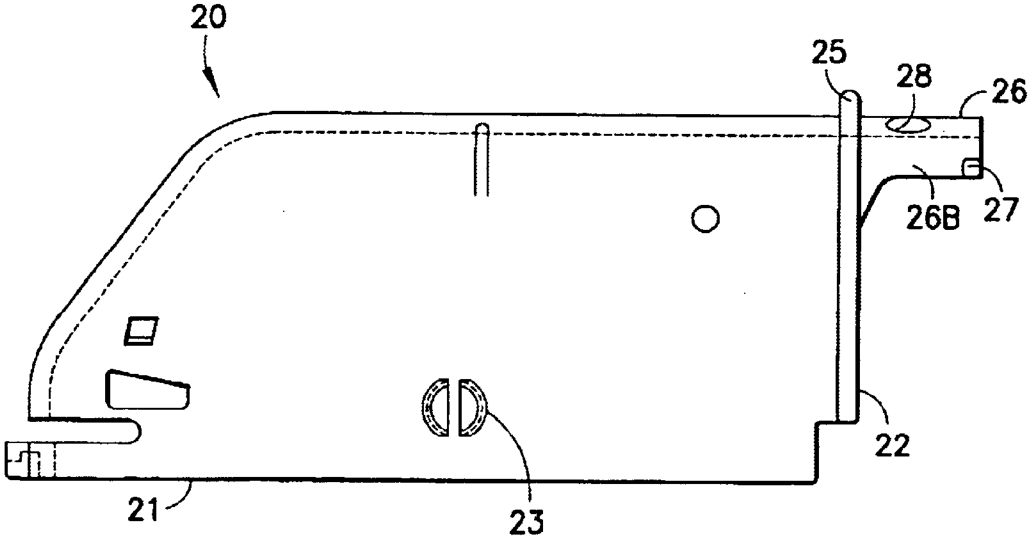
FIG. 2 is a side view of the wire cover.
Figure 3:
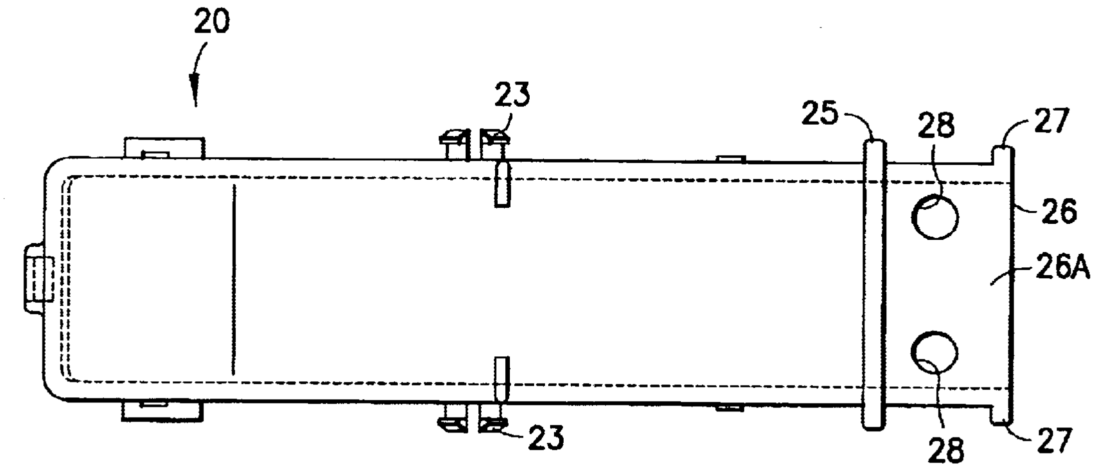
FIG. 3 is a plan view of the wire cover.
Figure 4:
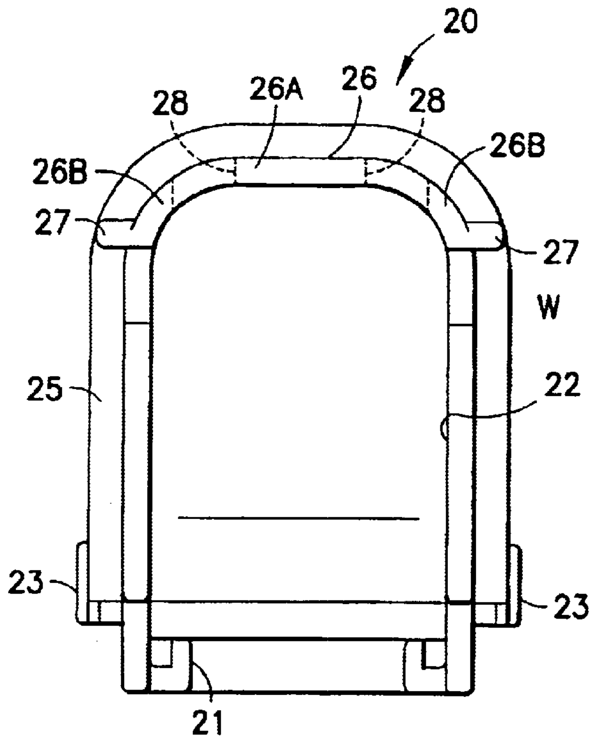
FIG. 4 is a rear view of the wire cover.

The wire cover 20 is made e.g. of a synthetic resin and is substantially in the form of a box that opens down and back as shown in FIGS. 2 to 4. A bottom opening 21 of the wire cover 20 is fitted on an upper or lateral part of the female housing 10, such that the wire cover 20 substantially covers the upper side of the female housing 10 and portions WC of wires W projecting therefrom. A rear opening of the wire cover 20 defines a wire draw-out opening 22 to be described in detail later. The wires W from the cavities are bent substantially at right angles and drawn out through the wire draw-out opening 22. Left and right supporting shafts 23 project from the opposite sides of the wire cover 20, and a lever 30 is mounted on the supporting shafts 23.

The lever 30 is substantially U-shaped, as shown in FIG. 1, and has a transverse operable portion 31 and substantially plate-shaped arms 32 that extend from opposite ends of the operable portion 31. The arms 32 are mounted pivotally on the supporting shafts 23. Each arm 32 has a cam groove 33, and cam pins of the male housing fit in the cam grooves 33 during connection of the female and male housings. The connection of the housings can be assisted by the cam action of the cam grooves 33 and the cam pins.

The wire draw-out opening 22 of the wire cover 20 is substantially rectangular, as shown in FIGS. 2–4, and a flange 25 bulges out at an edge of the wire draw-out opening 22. A substantially U-shaped wire fixing portion 26 is formed at the top of the wire draw-out opening 22 of the cover 20. The wire fixing portion 26 has an upper wall 26A and a pair of side walls 26B that project back from the flange 25. A bundling band or tie band 40 can be mounted around the wire fixing portion 26, as shown in FIG. 1, for bundling the wires W. Stoppers 27 project at the bottom ends of the side walls 26B to prevent the mounted bundling band 40 from coming off. Two transversely (i.e. direction normal to an extending direction of the wires W) spaced bundling holes 28 penetrate the upper wall 26A of the wire fixing portion 26 near its opposite ends for receiving the bundling band 40.

Figure 5:
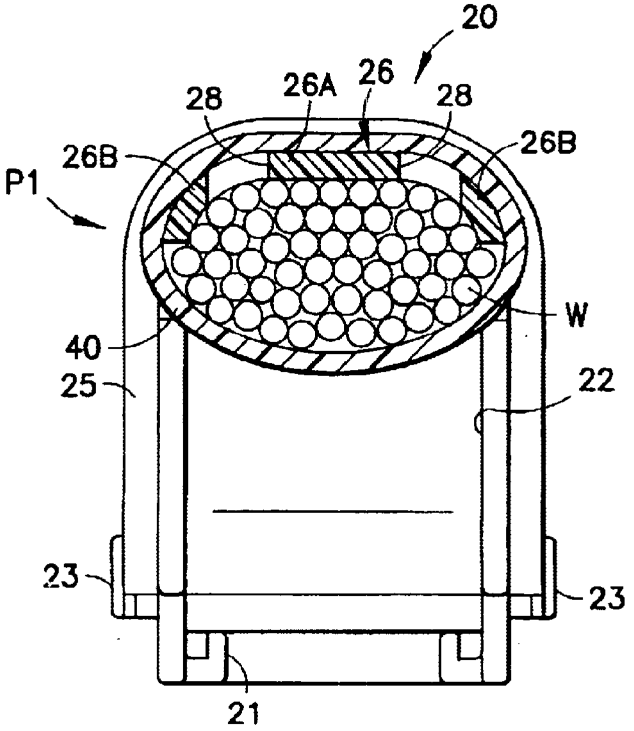
FIG. 5 is a section showing an exemplary mounting path of a bundling band.

The wires W drawn from the female housing 10 can be pressed against the inner side of the wire fixing portion 26. The bundling band 40 then is mounted around the wires W and around at least a portion of the wire fixing portion 26 to fasten the wires W to the cover 20. The mounting path of the bundling band 40 is selected according to the number and the outer diameters of the wires W to ensure that the wires W are fastened in a tense state. For example, FIG. 5 shows fastening a large number of the wires W where part of the bundle of the wires W bulges out from the wire fixing portion 26. Thus, the bundling band 40 is mounted around the wires W and the outer surfaces of the upper wall 26A and the side walls 26B of the wire fixing portion 26 along a bundling path P1 to press the wires W firmly against the wire fixing portion 26.

Figure 6:
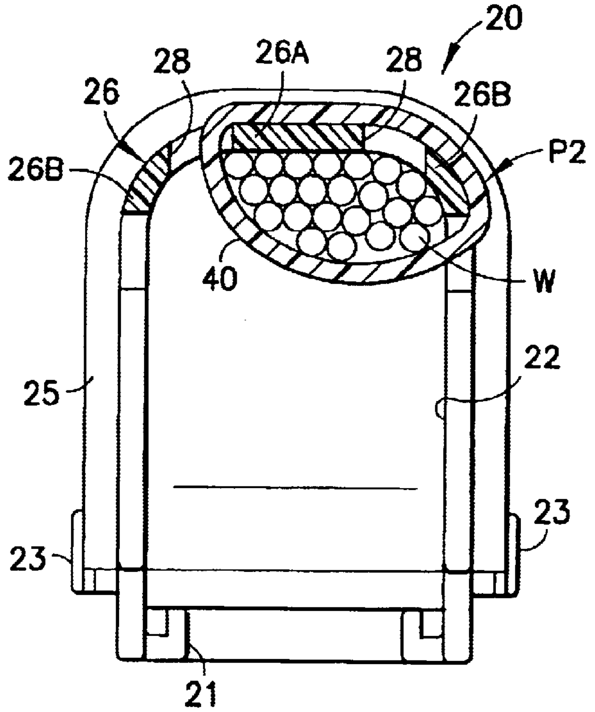
FIG. 6 is a section showing another exemplary mounting path of the bundling band.

FIG. 6 shows fastening a smaller number of wires W than in FIG. 5. Most of the wires W in FIG. 6 are accommodated in the wire fixing portion 26 and the wires W cannot be fastened well if the bundling band 40 is mounted around the entire wire fixing portion 26, as in the FIG. 5 example. Thus, the bundling band 40 is introduced through one bundling hole 28 and is mounted around the upper wall 26A and the side wall 26B at the side opposite from the introduced bundling hole 28 to define a bundling path P2, as shown in FIG. 6. Part of the bundle of the wires W bulges out from an inner recess defined by the upper wall 26A and the side wall 26B, and the bundling band 40 is mounted around the bulging-out portion. Thus, the wires W can be fastened and fixed.

Figure 7:
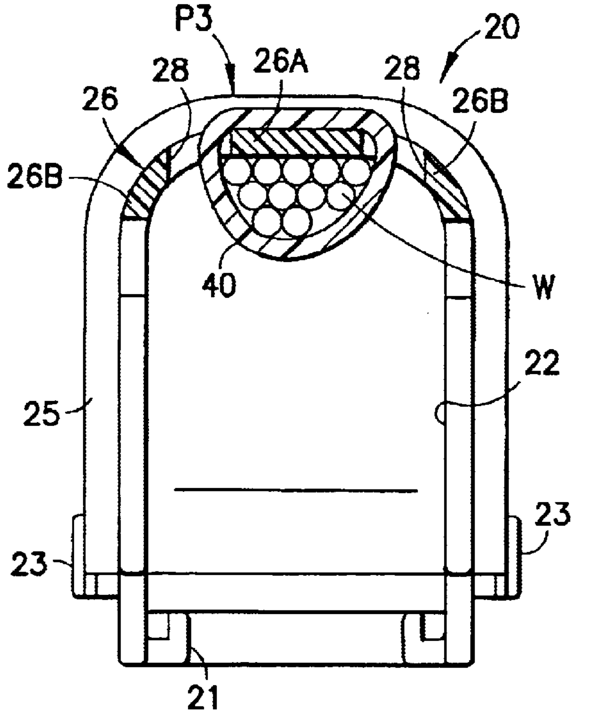
FIG. 7 is a section showing still another exemplary mounting path of the bundling band.
Figure 8:
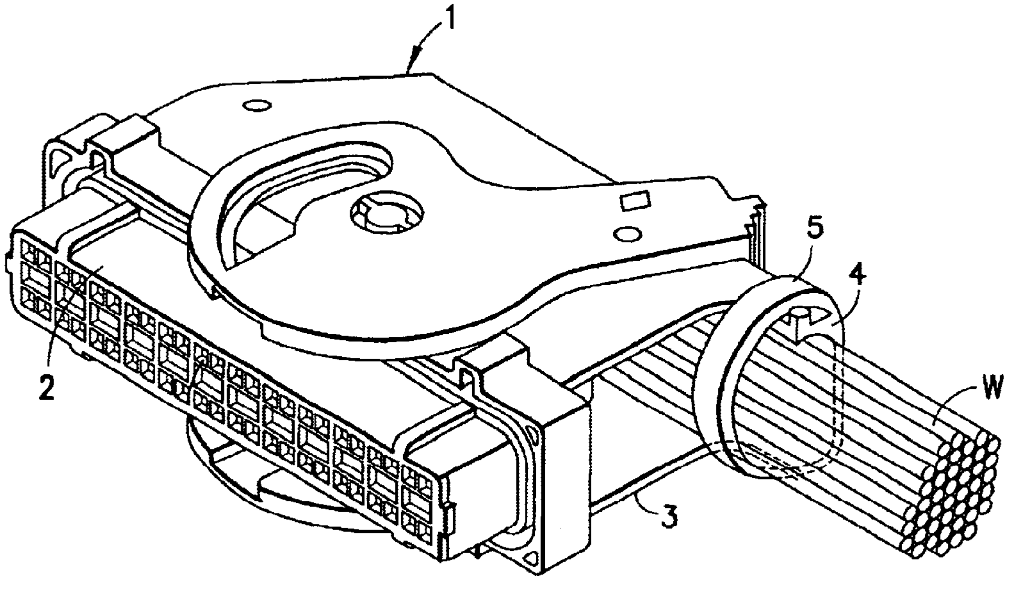
FIG.8 PRIOR ART
FIG. 8 is a perspective view showing a prior art wire cover.

FIG. 7 shows fastening even a smaller number of wires W. The wires W are fixed firmly by introducing the bundling band 40 through both bundling holes 28 and around only the upper wall 26A of the wire fixing portion 26 to define a bundling path P3.

As described above, the wires W can be fixed firmly to the wire fixing portion 26 by suitably selecting the mounting path P1, P2 or P3 for the bundling band 40 based on the number and outer diameters of the wires W. Further, the number of optional mounting paths P1–P3 of the bundling band 40 is increased by providing a plurality of bundling holes 28, and a more suitable mounting path can be selected based on the number of the wires W to be fixed and other factors.

The invention is not limited to the above described and illustrated embodiment. For example, the following embodiment also is embraced by the technical scope of the present invention as defined in the claims. Beside the following embodiment, various changes can be made without departing from the scope and spirit of the present invention as defined in the claims.

Although the wire fixing portion 26 has two bundling holes 28 in the foregoing embodiment, one, three or more bundling holes may be provided according to the present invention.

What is claimed is:

1. A wire cover mountable on a housing for accommodating a plurality of terminal fittings connected with ends of wires, the wire cover substantially covering portions of the wires drawn out from the housing, comprising:

a wire draw-out opening through which the wires can be drawn out, the wire draw-out opening being defined by a substantially U-shaped draw-out edge;

a wire fixing portion extending from the wire draw-out edge and around which a bundling band for bundling the wires is mountable to fasten the wire fixing portion together with the wires, the wire fixing portion having an outer surface and an inner surface, a plurality of bundling holes extending through the wire fixing portion from the outer surface to the inner surface, each of said bundling holes being dimensioned for receiving the bundling band to define a plurality of optional mounting paths for the bundling band;

a flange extending around at least a portion of the wire draw-out opening and projecting outwardly beyond the wire fixing portion; and at least one stopper projection projecting outwardly from the wire fixing portion at a location spaced from the flange so that the bundling holes are between the flange and the stopper projection, whereby the flange and the stopper projection maintain the bundling band on the wire fixing portion.

2. The wire cover of claim 1, wherein the wire fixing portion is substantially U-shaped in cross section.

3. The wire cover of claim 2, wherein the wire fixing portion comprises two lateral walls interconnected by a connecting wall, the bundling holes being in a border between the lateral walls and the connecting portion.

4. The wire cover of claim 1, wherein the at least one stopper projection comprises a plurality of stopper projections.

5. A connector having a housing with a rear opening for accommodating wires drawn-out from the housing, a wire cover mounted on the housing for at least partly covering the rear opening, a wire draw-out opening defined by a substantially U-shaped edge of the wire cover, said U-shaped edge being aligned substantially normal to the rear opening of the housing, a wire fixing wall extending from the U-shaped edge and around at least part of which a bundling band is mountable to fasten the wires to the wire fixing wall, the wire fixing wall having a plurality of bundling holes extending through the wire fixing wall from an outer surface to an inner surface, each of said bundling holes being dimensioned for receiving the bundling band to define a plurality of mounting paths for the bundling band a flange formed around the wire draw-out opening of the cover and projecting outwardly beyond the wire fixing wall and at least one stopper projection projecting out from the wire fixing wall and spaced from the flange, such that the bundling holes are between the flange and the stopper projection for preventing the bundling band from slipping off the wire fixing wall.

6. A wire cover for a housing that accommodates a plurality of terminal fittings connected with ends of wires, the housing having a rear opening from which the wires extend, the wire cover comprising:

a wire protecting portion having a plurality of walls for covering and guiding the wires drawn from the housing, the wire protecting portion having a bottom opening defined by at least one bottom edge configured for mounting on the rear of the housing and at least one wire draw-out opening through which the wires can be drawn out, the wire draw-out opening being defined by a generally U-shaped wire draw-out edge extending from and intersecting the bottom edge;

a wire fixing portion which extends from the wire draw-out opening the wire fixing portion having a connecting wall and first and second opposed lateral walls extending from opposite sides of the connecting wall, the wire fixing portion having an outer surface and an inner surface, first and second bundling holes formed through the connecting wall from the outer surface to the inner surface at respective borders between the connecting wall and the first and second lateral walls;

a flange projecting outwardly between the wire protecting portion and the wire fixing portion and substantially along the wire draw-out edge;

at least one stopper protection projecting outwardly from the wire fixing portion at locations spaced from the flange such that the bundling holes are between the flange and the stopper projection; and a bundling band extending through at least one of said bundling holes and having a first section disposed in abutting relationship to the outer surface of the wire fixing portion continuously at locations at least between the first and second bundling holes, and the bundling band having a second section facing the inner surface of said wire fixing portion to fasten the wires in direct contact with the second section of the bundling band and a portion of the inner surface of the wire fixing portion.

* * * * *